United States Patent
Browning et al.

(10) Patent No.: US 7,185,026 B2
(45) Date of Patent: Feb. 27, 2007

(54) METHOD FOR SYNCHRONIZING READ/UNREAD DATA DURING LOTUS NOTES DATABASE MIGRATION

(75) Inventors: Michelle M. Browning, Austin, TX (US); Robert Patrick Welch, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 10/824,810

(22) Filed: Apr. 15, 2004

(65) Prior Publication Data

US 2005/0234938 A1    Oct. 20, 2005

(51) Int. Cl.
*G06F 17/30*    (2006.01)
(52) U.S. Cl. .................. 707/201; 707/100; 707/200
(58) Field of Classification Search ............. None
See application file for complete search history.

(56) References Cited

U.S. PATENT DOCUMENTS

| | | | |
|---|---|---|---|
| 5,497,319 A | 3/1996 | Chong et al. | 364/419.02 |
| 5,500,796 A * | 3/1996 | Black, Jr. | 704/9 |
| 5,587,902 A | 12/1996 | Kugimiya | 395/752 |
| 5,819,272 A * | 10/1998 | Benson | 707/8 |
| 5,960,080 A * | 9/1999 | Fahlman et al. | 380/252 |
| 6,678,822 B1 | 1/2004 | Morar et al. | 713/182 |
| 2002/0059256 A1* | 5/2002 | Halim et al. | 707/10 |
| 2005/0125558 A1* | 6/2005 | Holden et al. | 709/242 |
| 2005/0131967 A1* | 6/2005 | Holden et al. | 707/204 |

* cited by examiner

*Primary Examiner*—Khanh B. Pham
*Assistant Examiner*—Thu-Nguyet Le
(74) *Attorney, Agent, or Firm*—David A. Mims, Jr.; Rudolf O. Siegesmund; Gordon & Rees, LLP

(57) ABSTRACT

A method for preserving the read/unread data when a database associated with an email program is moved from a source database to a destination database comprising a Migration Program (MP). The MP addresses the problem of the integrity of the association between the note IDs and the universal IDs when the database is moved, which alters the read/unread data for the user's messages. The MP determines the universal IDs associated with the note IDs. The MP then translates the note IDs into large pointers using the universal IDs. The MP then copies the read/unread table to the destination database and correlates the note IDs to the universal IDs. The MP then creates the note IDs. The result is that the association between the note IDs in the read/unread table, the universal IDs in the universal table, and thus the document data is preserved.

33 Claims, 4 Drawing Sheets

METHOD FOR SYNCHRONIZING READ/UNREAD DATA DURING LOTUS NOTES DATABASE MIGRATION

FIELD OF THE INVENTION

The present invention is directed generally to a method for preserving data when a database is moved from one server to another server and specifically to a method for conserving read/unread data when a LOTUS NOTES® database is migrated from one server to another server.

BACKGROUND OF THE INVENTION

Email management software has been an integral part of the modern business world. Email management software such as LOTUS NOTES® and MICROSOFT® OUTLOOK® allow users to store messages, email addresses, and other contact information. The email management software stores the user's email and contact data in an email management software database (database), usually on a separate server computer. In large companies, the database can be large and requires frequent maintenance by information technology (IT) professionals.

When performing maintenance on a server containing a database, IT professionals typically move the database to another server. This occurs when an IT professional has to replace a server or when a plurality of servers are being load balanced. Even when the IT professional is not maintaining the server, the IT professional may find it useful to move the database to a new server in order to make room for other programs on the old server or make the computer network run more efficiently.

One of the features of email management software is that the email management software distinguishes between read and unread email. The email management software distinguishes between read and unread messages by bolding the unread messages, by placing an unopened envelope next to the unread messages, or by some similar iconic or font change to the message. The icon or font change allows a user to discern which messages he has read and which messages he has not read. Within the database is a read/unread table that stores the data that indicates whether the user has read his messages in his mailbox.

Problems arise from the interaction of the email management software with the read/unread table. One problem is that the read/unread table may contain large amounts of document data. This is a problem because the read/unread table needs to be small in order for the email management software to operate efficiently. The email management software also requires the read/unread table to be in a fixed location within the database, limiting configuration options within the database. Therefore, a need exists for a read/unread table that is both small and fixed within the database.

As seen in FIG. 1, the solution to these problems is to fix the position of read/unread table 120 in the database and fill read/unread table 120 with a plurality of handles, called note IDs, instead of the document data 160. Read/unread table 120 contains a note ID for every unread message. The note IDs are four bytes in size and thus only contain enough information to point to a fixed location. The note IDs point to the location of a single universal ID within universal table 140. Universal table 140 is also in a fixed location within the database. Universal table 140 contains universal IDs, which are pointers that point to document data 160. The universal IDs are thirty two bytes in size, which is sufficient to contain all of the data required to point to document data 160 even when document data 160 is moved from one location to another. In other words, the universal IDs in universal table 140 contain the information required to find document data 160 when it is moved. Thus, the present configuration allows the email management software to run efficiently by only accessing a small, fixed read/unread table, allows document data 160 to be moved within the database, and allows the email program to find document data 160 through a series of pointers.

One of the problems that IT professionals encounter when moving the database from a source server to a destination server is that read/unread table 120, universal table 140, and/or document data 160 get reorganized during the move to the source server. As illustrated in FIG. 2, this reorganization causes a loss of integrity in the association between the note IDs in read/unread table 120 and document data 160 because the note IDs and the universal IDs become misaligned when they are moved from the source server to the destination server. In other words, read/unread table 120 is specific to a single server. As an example, in FIG. 1 note ID 1 is associated with document D, note ID 2 is associated with document C, and so forth. However, when the database is moved to a destination server (See FIG. 2), note ID 1 becomes associated with document B, note ID 2 becomes associated with document D, and so forth. Thus, when the database is moved, the database in the destination server shows a different read/unread status for each of the messages in the source database. The loss of integrity of the read/unread status in the email management software is disruptive to the user. Consequently, a need exists for a method for preserving the read/unread status for a plurality of messages when a database is moved from a source server to a destination server.

The prior art solution to the loss of integrity problem identified above is cumbersome and error prone. The prior art solution is to send an email to the user giving the user instructions on how to manually relate the note IDs in read/unread table 120 in the source database to the universal IDs in universal table 140 in the destination database. The user must perform a plurality of steps in a menu to relate the read/unread table in the source database with the restructured email data in the destination database. Failure by the user to correctly relate the read/unread table to the email data causes an error or inaccurately displays the read/unread data. Consequently, a need exists for a method for automatically preserving the read/unread status of a plurality of messages when a database is moved from a source server to a destination server.

SUMMARY OF THE INVENTION

The present invention, which meets the needs identified above, is a method for preserving the read/unread data when a database associated with an email program is moved from a source database to a destination database. The software embodiment of the present invention comprises a Migration Program (MP). The MP addresses the problem of the loss of integrity of the association between the note IDs and the universal IDs when the database is moved, which alters the read/unread data for the user's messages. The MP solves this problem using a five step process. First, the MP determines the universal IDs in the universal table in the source database associated with the note IDs in the read/unread table in the source database. Second, the MP translates the note IDs into large pointers using the universal IDs. Third, the MP copies the read/unread table to the destination database. Fourth, the MP correlates the location of the note IDs in the read/unread table in the destination database to the location of the universal IDs in the universal table in the destination database. Fifth, the MP creates note IDs for the read/unread table based on the correlation of the location of the note IDs to the location of the universal IDs. The result is that the association between the note IDs, the universal IDs, and the document data is preserved even though the order of the note IDs, the universal IDs, and the document data is changed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, tablet computers, and similar devices.

As used herein, the term "email management software" shall mean a software package that manages the email accounts for a user.

As used herein, the term "handle" shall mean a pointer to a pointer; that is, a variable that contains the address of another variable, which in turn contains the address of the desired object. The handle point to the address of the pointer, not to the pointer itself. A common application of a handle is that the handle points to a pointer stored in a fixed location in memory, whereas that pointer points to a movable block. Handles also consume less memory than pointers.

As used herein, the term "migrate" shall mean to move data from a source database in a source computer to a destination database in a destination computer.

As used herein, the term "note ID" shall mean a handle that points to a fixed location of another pointer. Within the context of a read/unread table, the note ID points to a universal ID and indicates which messages have been read and which messages have not been read.

As used herein, the term "pointer" shall mean a variable that contains the memory location (address) of some data rather than the data itself.

As used herein, the term "read/unread table" shall mean a table in an email management software database that contains a plurality of note IDs that point to universal IDs and wherein each note ID indicates which messages have been read and which messages have not been read.

As used herein, the term "synchronize" shall mean to verify that data in a source database is identical to the data in a destination database.

As used herein, the term "universal ID" shall mean a pointer that points to data. Within the context of email management software, the universal ID associates a note ID with a particular document.

As used herein, the term "universal table" shall mean a table of universal IDs. In an email management software database, the universal table contains a plurality of universal IDs, wherein each universal ID associates a note ID with a particular document's data.

Figure 3:
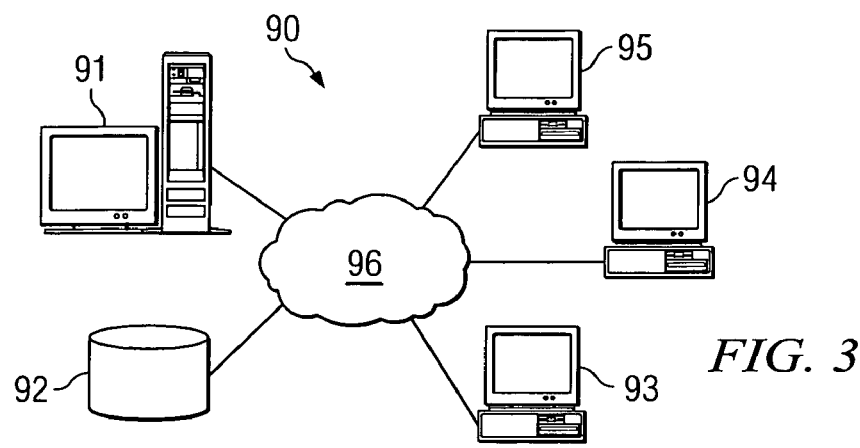
FIG. 3 is an illustration of a computer network used to implement the present invention.

FIG. 3 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 3 is intended as a representation of a possible operating network containing the present invention and is not meant as an architectural limitation.

Figure 4:
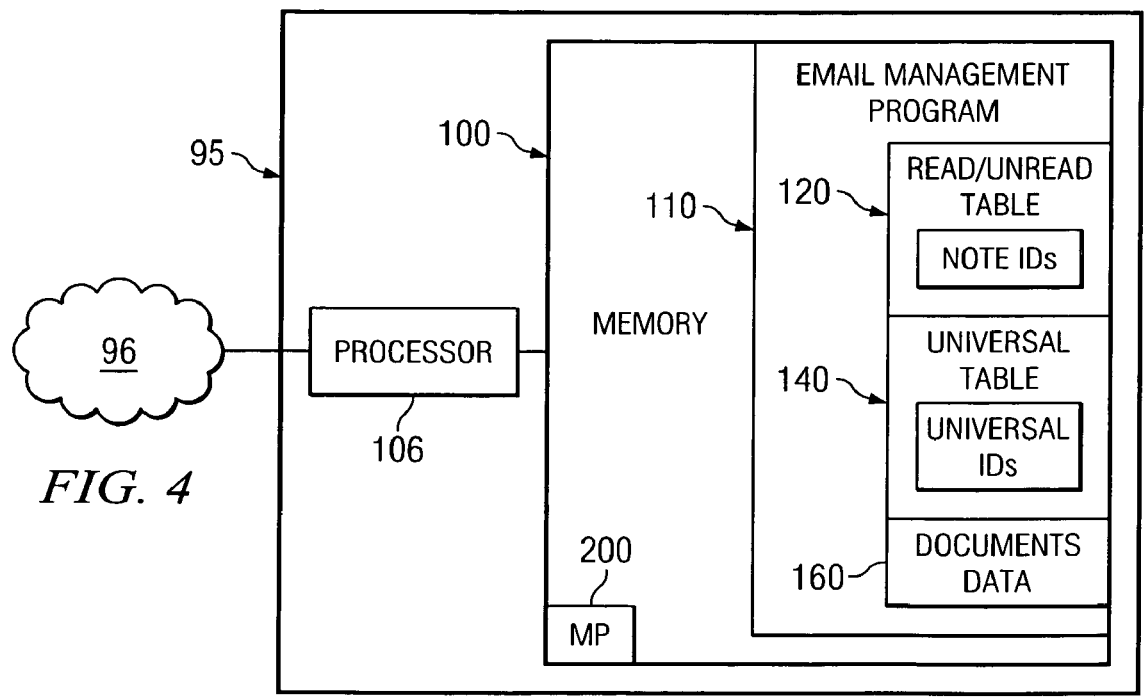
FIG. 4 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 4, the methodology of the present invention is implemented on software by Migration Program (MP) 200. MP 200 described herein can be stored within the memory of any computer depicted in FIG. 3. Alternatively, MP 200 can be stored in an external storage device such as a removable disk, a CD-ROM, or a USB storage device. Memory 100 is illustrative of the memory within one of the computers of FIG. 3. Memory 100 also contains email management software 100, including read/unread table 120, universal table 140, and document data 160. The present invention may interface with email management software 100, including read/unread table 120, universal table 140, and document data 160, through memory 100. As part of the present invention, the memory 100 can be configured with MP 200. Processor 106 can execute the instructions contained in MP 200. Processor 106 can communicate with other computers via network 96 using a protocol determined by a person of ordinary skill in the art, such as TCP/IP. Processor 106 and memory 100 are part of a computer such as local computer 95 in FIG. 3.

Read/unread table 120 is a table within email management software 110. Read/unread table contains the note IDs, which are handles that point to the universal IDs in universal table 140. The note IDs point to a fixed location within universal table 140. Universal table 140 is a table within email management software 110. Universal table 140 contains the universal IDs, which are large pointers that point to document data 160. The universal IDs point to document data 160 even when the universal IDs and document data 160 are moved within the database. Document data 160 is the data associated with each document in email management software 110.

The present invention may be a method, a stand alone computer program, or a plug-in to an existing computer program. Persons of ordinary skill in the art are aware of how to configure computer programs, such as those described herein, to plug into an existing computer program. In alternative embodiments, the present invention can be stored in the memory of other computers. Storing the present invention in the memory of other computers allows the processor workload to be distributed across a plurality of processors instead of a single processor. Further configurations of the present invention across various memories are known by persons of ordinary skill in the art.

Figure 1:
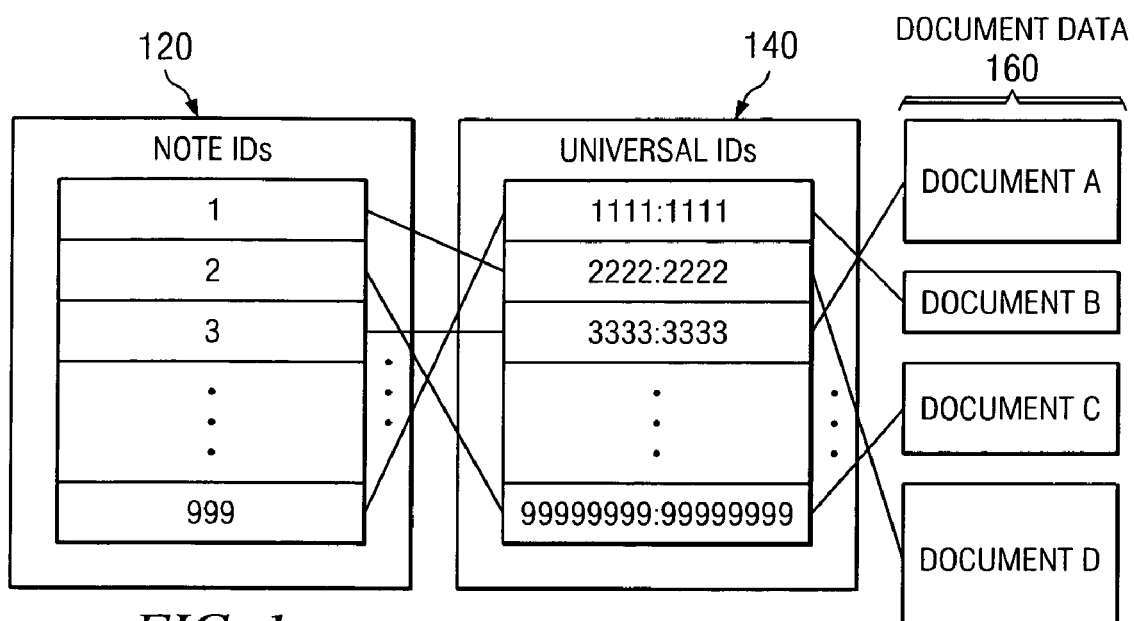
FIG. 1 is an illustration of the structure of the tables and data within the source database.
Figure 2:
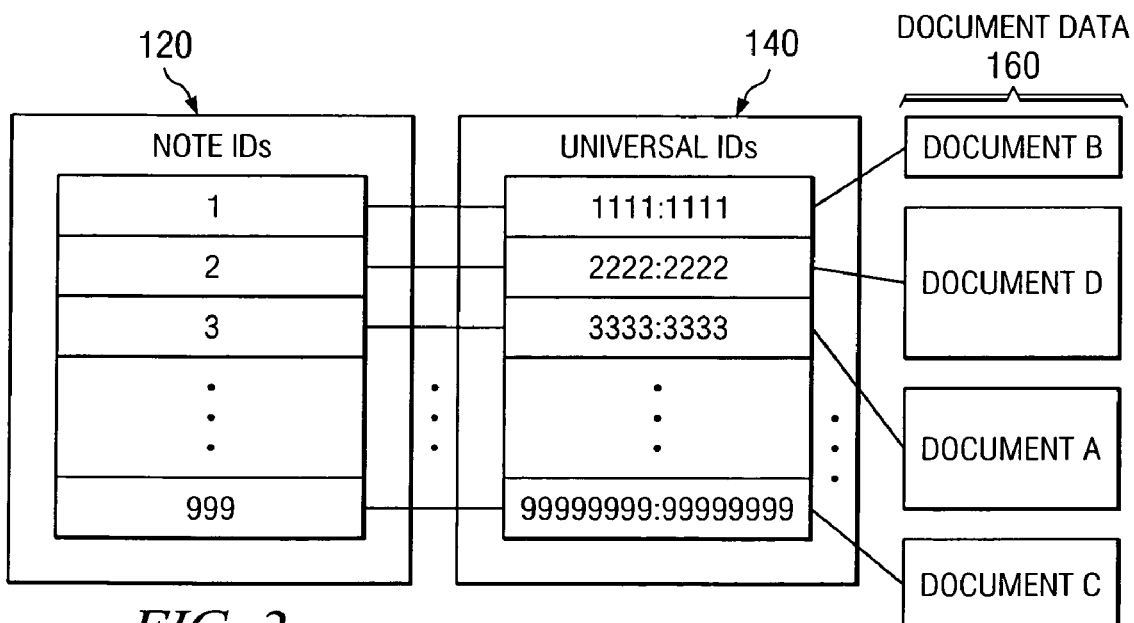
FIG. 2 is an illustration of the structure of the tables and data within destination database when the tables and data are copied from the source database without the present invention.
Figure 5:
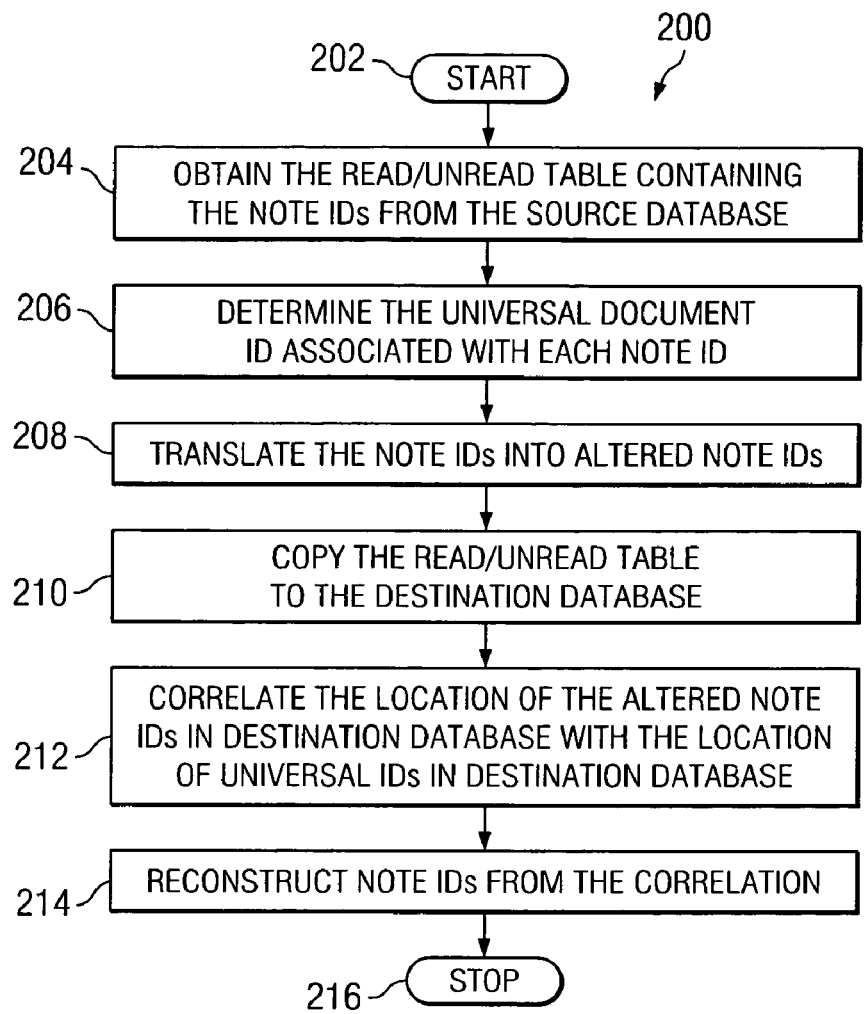
FIG. 5 is an illustration of the logic of the Migration Program (MP) of the present invention.
Figure 6A:
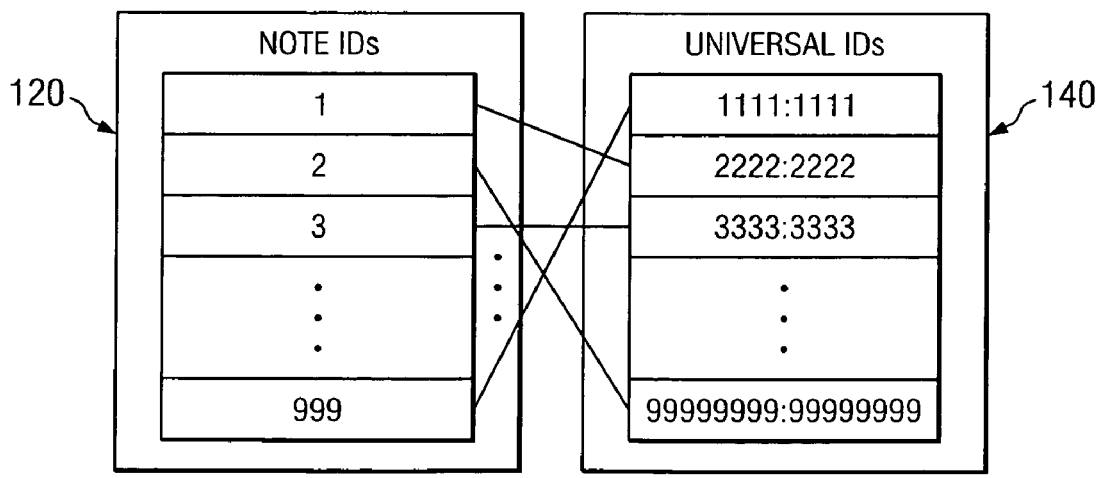
FIGS. 6A, 6B, 6C, and 6D illustrate the changes in the structure of the tables and data when the present invention is implemented.
Figure 6B:
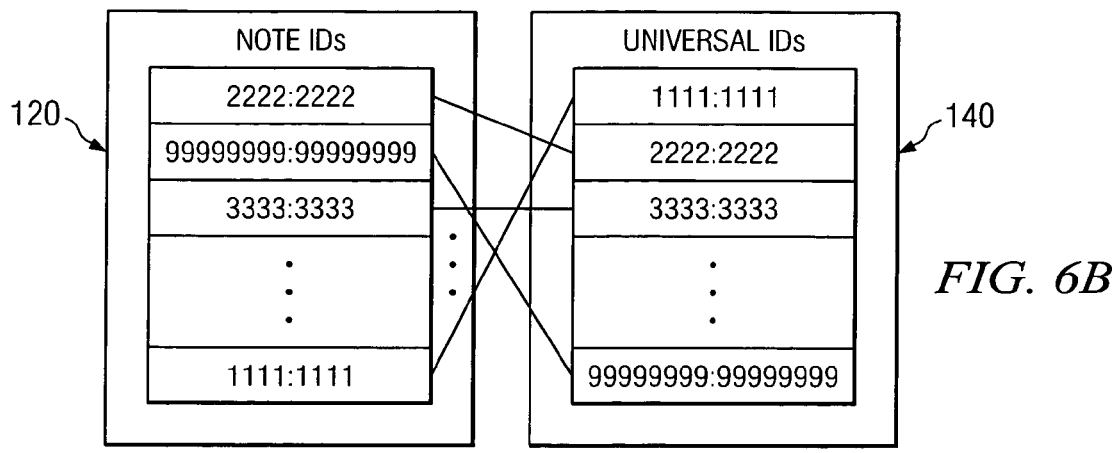

FIG. 5 is an illustration of the logic of Migration Program (MP) 200. MP 200 is software that preserves the read/unread data when the database is moved from the source database to the destination database. MP 200 starts (202) when an IT professional prepares to move the database from the source database to the destination database. MP 200 obtains the read/unread table containing the note IDs from the source database (204). As an example, the read/unread table may be like read/unread table 120 displayed in FIGS. 1, 2, and 4. The note IDs in read/unread table 120 are handles and merely point to a specific location within universal table 140, not to the data itself. If the order of note IDs or universal IDs were disturbed, then the association between note IDs and the document data (See FIGS. 1 and 2) would be changed and the read/unread data would not be preserved. MP 200 then determines which universal IDs that the note IDs are associated with (206). The association between the note IDs in read/unread table 120 and the universal IDs in universal table 140 can be seen in FIGS. 1 and 6A. MP 200 then translates the note IDs into larger pointers, called altered note IDs, using the universal IDs (208). The translation of a small pointer into a larger pointer is well known within the art. The translation of note IDs into altered note IDs can be seen in FIG. 6B. Each altered note IDs is a large pointer and points to a specific universal ID, rather than to the location of the universal ID. Thus, if the universal ID is moved, the altered note ID can find the universal ID.

Figure 6C:
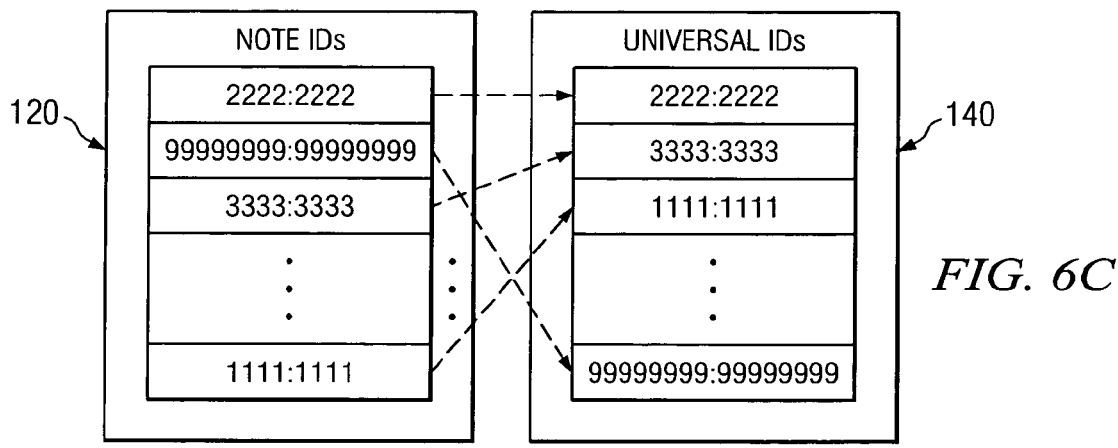
Figure 6D:
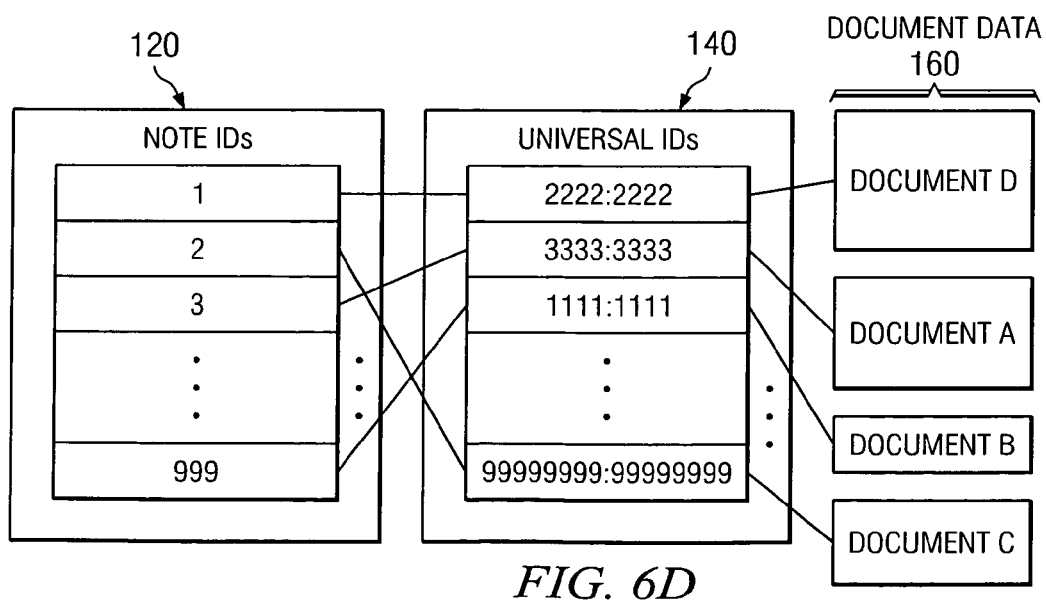

MP 200 then copies read/unread table 120 from the source database to the destination database (210). Because the original note IDs have been replaced with altered note IDs containing pointers similar to the universal ID pointers, the altered note IDs can be correlated to the universal IDs in universal table 140 in the destination database. After read/unread table 120 has been copied to the destination database, MP 200 correlates the location of the altered note IDs in read/unread table with the location of the universal IDs in universal table 140 (212). Correlation is the process of associating the location (i.e. the address within the memory) of each altered note ID with the location of a universal ID in the destination database. The altered note IDs can be correlated to the universal IDs because the altered note IDs point to the universal IDs, not just the location of the note IDs. The correlation of the location of the altered note IDs in read/unread table 120 with the location of the universal IDs in universal table 140 can be seen in FIG. 6C. Finally, MP 200 creates the note IDs from the correlation established in step 212 (214). In other words, for each note ID, MP 200 creates a small pointer that points to the location of the universal ID that was established in step 212. The creation of the note IDs in read/unread table 120 can be seen in FIG. 6D. In FIG. 6D, the note IDs are shown as prime because they do not point to the same location as the note IDs in FIG. 6A. MP 200 then ends (216). One novel aspect of the invention is that although the order of the universal IDs in universal table 140 has changed, the association between the note IDs in read/unread table 120 and the universal IDs in universal table 140 is preserved from FIG. 6A to FIG. 6D. In other words, note ID 1 is still associated with universal ID 2222:2222 (and thus document D), note ID 2 is still associated with universal ID 99999999:99999999 (and thus document C), and so forth.

Persons of ordinary skill in the art will appreciate that the present invention may be implemented for a plurality of read/unread tables for a plurality of users on a single email account. For example, the email management software can be configured such that an executive and his secretary both have access to the executive's email. The email management software distinguishes between the messages that the executive has read and the messages that the secretary has read. Thus, the email management software is able to indicate to the executive which messages he has read regardless of the number of messages that the secretary has read. Similarly, the email management software is able to indicate to the secretary which messages she has read regardless of the number of messages that the executive has read. The email management software is able to do this by maintaining separate read/unread tables for the executive and the secretary. Consequently, persons of ordinary skill in the art will appreciate that the present invention can be applied to a plurality of read/unread tables for a plurality of users, such as an executive and a secretary.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A computer implemented method for automatically preserving a read/unread data for a plurality of messages, in an email management software, when a source database is migrated to a destination database comprising the steps of:
   obtaining a read/unread table from the source database;
   determining a first universal ID associated with a note ID;
   translating the note ID into an altered note ID;
   copying the altered note ID to the destination database;
   correlating a first location of the altered note ID to a second location of a second universal ID;
   creating a reconstructed note ID from the correlation of the first location of the altered note ID and the second location of the second universal ID;
   wherein the first universal ID links a read/unread data to a document data; and
   wherein the read/unread table in the destination database contains the reconstructed note ID.

2. The method of claim 1 wherein the first universal ID is located in the source database.

3. The method of claim 2 wherein the second universal ID is located in the destination database.

4. The method of claim 3 wherein the association between the note ID and the document data is the same in the source database as the destination database.

5. The method of claim 4 wherein the above steps occur as part of a synchronization process.

6. The method of claim 5 wherein the note ID points to a fixed location.

7. The method of claim 6 wherein the universal ID points to the document data regardless of whether the document data changes locations within the database.

8. The method of claim 7 wherein the association between the note ID and the document data is the same in the source database as the destination database even though the arrangement of the document data and the second universal ID have been changed.

9. The method of claim 8 wherein the note ID is a handle.

10. The method of claim 9 wherein the size of the note ID is four bytes.

11. The method of claim 10 wherein the first universal ID is a pointer.

12. The method of claim 11 wherein a first universal ID size is thirty two bytes.

13. The method of claim 12 wherein the second universal ID is a pointer.

14. The method of claim 13 wherein a second universal ID size is thirty two bytes.

15. The method of claim 14 wherein the altered note ID is a thirty two byte pointer.

16. The method of claim 15 wherein an altered note ID size is thirty two bytes.

17. A program product for automatically preserving a read/unread data for a plurality of messages, in an email management software, when a source database is migrated to a destination database, the program product comprising:
   a memory;
   wherein the memory comprises instructions for a processor to perform steps comprising:
      obtaining a read/unread table from the source database;
      determining a first universal ID associated with a note ID;
      translating the note ID into an altered note ID;
      copying the altered note ID to the destination database;
      correlating a first location of the altered note ID to a second location of a second universal ID;
      creating a reconstructed note ID from the correlation of the first location of the altered note ID and the second location of the second universal ID;
   wherein the first universal ID links the read/unread data to a document data;
   and
   wherein a second read/unread table in the destination database contains the reconstructed note ID.

18. The program product of claim 17 wherein the first universal ID is located in the source database.

19. The program product of claim 17 wherein the second universal ID is located in the destination database.

20. The program product of claim 17 wherein the association between the note ID and the document data in the source database is the same as the association between the reconstructed note ID and the document data in the destination database.

21. The program product of claim 17 wherein the above steps occur as part of a synchronization process.

22. The program product of claim 17 wherein the note ID points to a fixed location.

23. The program product of claim 17 wherein the universal ID points to the document data regardless of whether the document data changes locations within the database.

24. The program product of claim 17 wherein the association between the note ID and the document data in the source database is the same as the association between the reconstructed note ID and the documents data in the destination database even though the arrangement of the document data and the second universal ID have been changed.

25. The program product of claim 17 wherein the note ID is a handle.

26. The program product of claim 17 wherein the size of the note ID is four bytes.

27. The program product of claim 17 wherein the first universal ID is a pointer.

28. The program product of claim 17 wherein a first universal ID size is thirty two bytes.

29. The program product of claim 17 wherein the second universal ID is a pointer.

30. The program product of claim 17 wherein a second universal ID size is thirty two bytes.

31. The program product of claim 17 wherein the altered note ID is a thirty two byte pointer.

32. The program product of claim 17 wherein the size of the altered note ID is thirty two bytes.

33. An apparatus for automatically preserving a read/unread data for a plurality of messages, in an email management software, when a source database is migrated to a destination database, the apparatus comprising:
   a computer connected to the source database and the destination database;
   means for obtaining a read/unread table from the source database;
   means for determining a first universal ID associated with a note ID;
   means for translating the note ID into an altered note ID;
   means for copying the altered note ID to the destination database;
   means for correlating a first location of the altered note ID to a second location of a second universal ID;
   means for creating a reconstructed note ID from the correlation of the first location of the altered note ID and the second location of the second universal ID; and
   wherein the first universal ID links a read/unread data to a document data;
   wherein the read/unread table in the destination database contains the reconstructed note ID;
   wherein the first universal ID is located in the source database;
   wherein the second universal ID is located in the destination database;
   wherein the association between the note ID and the document data in the source database is the same as the association between the reconstructed note ID and the document data in the destination database;
   wherein the above steps occur as part of a synchronization process;
   wherein the note ID points to a fixed location;
   wherein the universal ID points to the document data regardless of whether the document data changes locations within the database;
   wherein the association between the note ID and the document data in the source database is the same as the association between the reconstructed note ID and the document data in the destination database even though the arrangement of the document data and the second universal ID have been changed;
   wherein the note ID is a handle;
   wherein the size of the note ID is four bytes;
   wherein the first universal ID is a pointer;
   wherein the size of the first universal ID is thirty two bytes;
   wherein the second universal ID is a pointer;
   wherein the size of the second universal ID is thirty two bytes;
   wherein the altered note ID is a thirty two byte pointer; and
   wherein the size of the altered note ID is thirty two bytes.

* * * * *